US012684651B2

(12) United States Patent
　　　Koskinen et al.

(10) Patent No.:　US 12,684,651 B2
(45) Date of Patent:　　Jul. 14, 2026

(54) APPARATUSES AND METHODS FOR INFORMING MASTER NODE OF IMPENDING WRAP-AROUND OF PACKET COUNTER VALUE

(71) Applicant: Nokia Technologies Oy, Espoo (FI)

(72) Inventors: Henri Koskinen, Espoo (FI); Samuli Turtinen, Ii (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/960,299

(22) PCT Filed: Dec. 19, 2018

(86) PCT No.: PCT/FI2018/050944
§ 371 (c)(1),
(2) Date: Jul. 6, 2020

(87) PCT Pub. No.: WO2019/138152
PCT Pub. Date: Jul. 18, 2019

(65) Prior Publication Data
US 2021/0059008 A1　　Feb. 25, 2021

Related U.S. Application Data

(60) Provisional application No. 62/616,754, filed on Jan. 12, 2018.

(51) Int. Cl.
H04W 76/36　　　(2018.01)
H04W 80/02　　　(2009.01)
H04W 92/20　　　(2009.01)
(52) U.S. Cl.
CPC ............ H04W 76/36 (2018.02); H04W 80/02 (2013.01); H04W 92/20 (2013.01)

(58) Field of Classification Search
CPC ...... H04W 76/36; H04W 92/20; H04W 80/02
See application file for complete search history.

(56) References Cited

U.S. PATENT DOCUMENTS 8,213,610 B2 *　7/2012　Alanara ................. H04L 9/065
　　　　　　　　　　　　　　　　　　　　713/168
8,274,900 B2　　9/2012　Yi et al.
　　　　　　　　　(Continued)

FOREIGN PATENT DOCUMENTS

CN　　　104969592 A　　10/2015
EP　　　2 785 091 A1　　10/2014
　　　　　　　　(Continued)

OTHER PUBLICATIONS

Office Action received for corresponding Taiwan Patent Application No. 108100884, dated Jun. 29, 2020, 3 pages of Office Action and 2 pages of translation available.
(Continued)

*Primary Examiner* — Wutchung Chu
*Assistant Examiner* — Berhanu D Belete
(74) *Attorney, Agent, or Firm* — SQUIRE PATTON BOGGS (US) LLP

(57)　　　　　　ABSTRACT

Systems, methods, apparatuses, and computer program products for informing a multi-connectivity master node of an impending wrap around of packet counter value are provided. One method includes receiving, from a nodehosting packet data convergence protocol (PDCP) for a data radio bearer (DRB), a counter check request including a count value, and determining that the count value is approaching its maximum value. In response to the determining, the method may further include initiating release of the data radio bearer (DRB) and optionally adding a new bearer.

4 Claims, 3 Drawing Sheets

100

110　　　　　　　　　　　　　　　　　120

(56) References Cited

U.S. PATENT DOCUMENTS

| | | | | |
|---|---|---|---|---|
| 10,064,051 B2* | 8/2018 | Ingale | H04W 76/15 | |
| 10,524,120 B2* | 12/2019 | Rajadurai | H04W 12/06 | |
| 2008/0090549 A1* | 4/2008 | Vialen | H04W 12/106 | |
| | | | | 455/405 |
| 2008/0096530 A1* | 4/2008 | Kuo | H04W 12/02 | |
| | | | | 455/411 |
| 2010/0329452 A1* | 12/2010 | Alanara | H04W 12/041 | |
| | | | | 380/44 |
| 2012/0051288 A1* | 3/2012 | Dwyer | H04W 76/27 | |
| | | | | 370/328 |
| 2012/0099525 A1 | 4/2012 | Maheshwari | | |
| 2013/0310006 A1* | 11/2013 | Chen | H04W 12/04 | |
| | | | | 455/411 |
| 2014/0233736 A1* | 8/2014 | Zhang | H04L 63/065 | |
| | | | | 380/270 |
| 2014/0237559 A1* | 8/2014 | Zhang | H04W 88/08 | |
| | | | | 726/4 |
| 2015/0126154 A1* | 5/2015 | Yang | H04W 36/28 | |
| | | | | 455/411 |
| 2015/0208235 A1* | 7/2015 | Ingale | H04W 74/0833 | |
| | | | | 455/411 |
| 2015/0280905 A1* | 10/2015 | Shah | H04L 47/34 | |
| | | | | 370/504 |
| 2015/0289166 A1* | 10/2015 | Miao | H04L 69/324 | |
| | | | | 370/328 |
| 2016/0029213 A1* | 1/2016 | Rajadurai | H04L 63/068 | |
| | | | | 380/283 |
| 2016/0205547 A1* | 7/2016 | Rajadurai | H04W 76/28 | |
| | | | | 726/4 |
| 2016/0302075 A1* | 10/2016 | Dudda | H04W 12/106 | |
| 2016/0315868 A1* | 10/2016 | Zhang | H04L 47/624 | |
| 2018/0083688 A1* | 3/2018 | Agiwal | H04W 12/033 | |
| 2018/0270654 A1* | 9/2018 | Rajadurai | H04W 76/16 | |
| 2018/0367990 A1* | 12/2018 | Ingale | H04W 12/122 | |
| 2018/0376330 A1* | 12/2018 | Basu Mallick | H04W 12/0433 | |
| 2018/0376331 A1* | 12/2018 | Lohr | H04L 9/0819 | |
| 2018/0376332 A1* | 12/2018 | Basu Mallick | H04L 9/0819 | |
| 2019/0089425 A1* | 3/2019 | Zhang | H04W 52/0229 | |
| 2019/0281521 A1* | 9/2019 | Zhang | H04W 76/27 | |
| 2019/0297610 A1* | 9/2019 | Yi | H04L 1/1896 | |
| 2019/0342791 A1* | 11/2019 | Torsner | H04L 43/06 | |
| 2019/0364423 A1* | 11/2019 | Ingale | H04L 5/0048 | |
| 2019/0373529 A1* | 12/2019 | Zhang | H04W 36/00695 | |
| 2019/0394651 A1* | 12/2019 | Wifvesson | H04L 63/205 | |
| 2020/0068395 A1* | 2/2020 | Ingale | H04W 12/122 | |
| 2020/0100102 A1* | 3/2020 | Xu | H04W 12/033 | |

FOREIGN PATENT DOCUMENTS

| | | | | | |
|---|---|---|---|---|---|
| WO | WO-2010078724 A1 * | 7/2010 | | | H04W 12/06 |
| WO | WO-2014177107 A1 * | 11/2014 | | | H04W 36/08 |
| WO | 2015/108389 A1 | 7/2015 | | | |

OTHER PUBLICATIONS

"3rd Generation Partnership Project; Technical Specification Group Radio Access Network; NR; Packet Data Convergence Protocol (PDCP) specification (Release 15)", 3GPP TS 38.323, V2.0.0, Dec. 2017, 27 pages.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V2.0.0, Dec. 2017, 52 pages.

"3rd Generation Partnership Project; Technical Specification Group Radio Access Network; Evolved Universal Terrestrial Radio Access Network (E-UTRAN); X2 application protocol (X2AP) (Release 14)", 3GPP TS 36.423, V14.4.0, Sep. 2017, pp. 1-242.

International Search Report and Written Opinion received for corresponding Patent Cooperation Treaty Application No. PCT/FI2018/050944, dated Apr. 4, 2019, 15 pages.

"Possibility of NR PDCP Count Wrapping Around", 3GPP TSG-RAN WG2 #100, R2-1713379, Agenda: 10.2.6, Nokia, Nov. 27-Dec. 1, 2017, 2 pages.

"Security for CP-UP Separation", 3GPP TSG-RAN WG3 Meeting #98, R3-174838, Agenda: 22.2, Ericsson, Nov. 27-Dec. 1, 2017, 3 pages.

"Signaling at PDCP-Count Wraparound in Secondary Node", 3GPP TSG-RAN WG3 NR Ad hoc 1801, R3-180055, Agenda: 31.3.1, Nokia, Jan. 22-26, 2018, 2 pages.

"Correction of counter Check procedure for EN-DC", 3GPP TSG-RAN WG3 Meeting AH-1801, R3-180056, Nokia, Jan. 22-26, 2018, 2 pages.

Tentative Rejection received for corresponding Taiwan Patent Application No. 108100884, dated Dec. 25, 2019, 19 pages of Tentative Rejection and 4 pages of translation available.

Office Action received for corresponding Japanese Patent Application No. 2020-538565, dated Sep. 21, 2021, 4 pages of Office Action and 4 pages of translation available.

"SeNB Initiated Security Procedure", 3GPP TSG RAN WG3 Meeting #85bis, R3-142194, Agenda: 20.1.4, Huawei, Oct. 6-10, 2014, 4 pages.

Official Letter of Second Office Action issued in corresponding Taiwanese Patent Application No. 108100884 dated Sep. 2, 2022, with English summary thereof.

Communication pursuant to Article 94(3) EPC issued in corresponding European Patent Application No. 18 839 534.7 dated Apr. 28, 2022.

Decision of Rejection issued in corresponding Japanese Patent Application No. 2020-538565 dated Apr. 25, 2022, with English summary thereof.

European Communication pursuant to Article 94(3) EPC, corresponding to EP Application No. 18 839 534.7, dated May 31, 2023.

Chinese Office Action, with English Summary, corresponding to CN Application No. 201880090975.4, dated May 18, 2023.

First Office Action dated Dec. 23, 2022 corresponding to Chinese Patent Application No. 201880090975.4, with English Summary thereof.

European Communication under Rule 71(3) EPC, corresponding to EP Application No. 18 839 534.7, dated Feb. 13, 2024.

European Communication under Rule 71(3) EPC, corresponding to EP Application No. 18 839 534.7, dated Jun. 18, 2024.

European Communication under Rule 71(3) EPC, corresponding to EP Application No. 18 839 534.7, dated Sep. 16, 2024.

* cited by examiner

100

110                                              120

| HFN | PDCP SN |

APPARATUSES AND METHODS FOR INFORMING MASTER NODE OF IMPENDING WRAP-AROUND OF PACKET COUNTER VALUE

RELATED APPLICATION

This application was originally filed as PCT Application No. PCT/FI2018/050944, filed on 19 Dec. 2018, which claims priority from U.S. Provisional Application No. 62/616,754, filed on 12 Jan. 2018, each of which is incorporated herein by reference in its entirety.

FIELD

Some example embodiments may generally relate to mobile or wireless telecommunication systems. For instance, certain example embodiments may relate to the packet data convergence protocol (PDCP) in such telecommunication systems, such as Long Term Evolution (LTE) or new radio (NR).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in UTRAN or eNB in LTE) may be referred to as a next generation or 5G Node B (gNB).

SUMMARY

One embodiment is directed to method, which may include receiving, from a node hosting packet data convergence protocol (PDCP) for a data radio bearer (DRB), a counter check request including a count value, and determining that the count value is approaching its maximum value. In response to the determining, the method may include initiating release of the data radio bearer (DRB) and optionally adding a new bearer.

Another embodiment is directed to an apparatus including at least one processor and at least one memory comprising computer program code. The at least one memory and computer program code configured, with the at least one processor, to cause the apparatus at least to receive, from a node hosting packet data convergence protocol (PDCP) for a data radio bearer (DRB), a counter check request including a count value, and to determine that the count value is approaching its maximum value. In response to the determining, the at least one memory and computer program code are configured, with the at least one processor, to cause the apparatus at least to initiate release of the data radio bearer (DRB) and optionally add a new bearer.

Another embodiment is directed to a method, which may include receiving, from a node hosting packet data convergence protocol (PDCP) for a data radio bearer (DRB), a counter check request that indicates that a count wrap-around will be occurring. In response to receiving the request, the method may further include initiating release of the data radio bearer (DRB) and optionally adding a new bearer. The counter check request may include a count value that is approaching its maximum value.

Another embodiment is directed to an apparatus including at least one processor and at least one memory comprising computer program code. The at least one memory and computer program code configured, with the at least one processor, to cause the apparatus at least to receive, from a node hosting packet data convergence protocol (PDCP) for a data radio bearer (DRB), a counter check request that indicates that a count wrap-around will be occurring. In response to receiving the request, the at least one memory and computer program code are configured, with the at least one processor, to cause the apparatus at least to initiate release of the data radio bearer (DRB) and optionally add a new bearer. The counter check request may include a count value that is approaching its maximum value.

Another embodiment is directed to a method, which may include determining or detecting that a count value is approaching its maximum value, and transmitting, to a master node, a counter check request including the count value that is approaching its maximum value.

Another embodiment is directed to an apparatus including at least one processor and at least one memory comprising computer program code. The at least one memory and computer program code configured, with the at least one processor, to cause the apparatus at least to determine or detect that a count value is approaching its maximum value, and transmit, to a master node, a counter check request including the count value that is approaching its maximum value.

Another embodiment is directed to a method, which may include determining or detecting that a counter wrap-around is to occur, transmitting, to a master node, a counter check request indicating that the counter wrap-around is to occur. The counter check request may include a count value that is approaching its maximum value.

Another embodiment is directed to an apparatus including at least one processor and at least one memory comprising computer program code. The at least one memory and computer program code configured, with the at least one processor, to cause the apparatus at least to determine or detect that a counter wrap-around is to occur, transmit, to a master node, a counter check request indicating that the counter wrap-around is to occur. The counter check request may include a count value that is approaching its maximum value.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for informing a multi-connectivity master node of an impending wrap around of packet counter value, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles, teachings and embodiments of this invention, and not in limitation thereof.

Certain embodiments may be directed to an approach for preventing the wrap-around of the packet data convergence protocol (PDCP) count value. It is noted that the new radio (NR) PDCP count is defined in the 3GPP NR PDCP technical specification (TS) 38.323. A wrap-around of the count may refer to the count's re-assignment to 0 after reaching the maximum value. The 3GPP specification(s) indicate that the NR PDCP count does not wrap around, whereas, in LTE PDCP, the count is allowed to wrap around.

Figure 1:
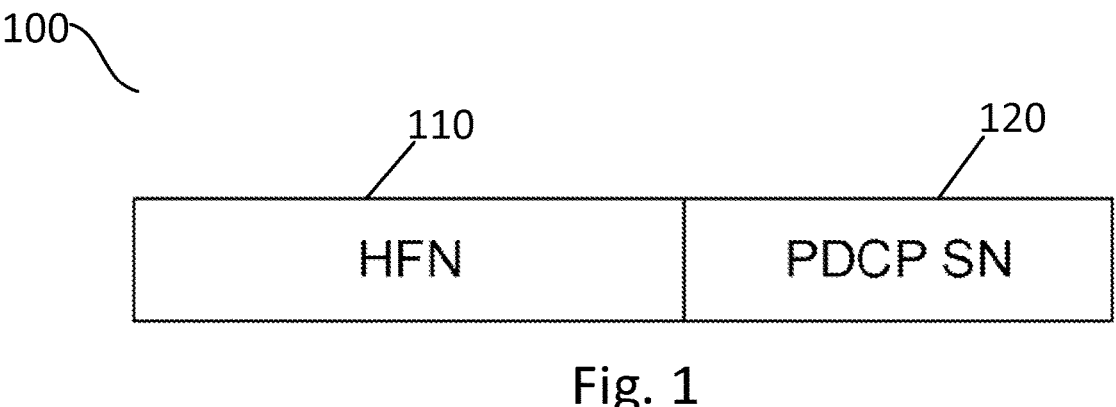
FIG. 1 illustrates an example block diagram depicting the format of a counter, according to one embodiment.

FIG. 1 illustrates an example block diagram depicting the format of the count 100, according to one embodiment. As illustrated in the example of FIG. 1, the count value may be composed of a hyper frame number (HFN) 101 and PDCP sequence number (SN) 102. In an example embodiment, the length of count 100 may be 32 bits and the size of the HFN part 101 may be equal to 32 bits minus the length of the PDCP SN 102.

Various example embodiments are directed to avoiding a count wrap-around when a UE is configured in dual (or multi-) connectivity, and specifically on bearers mapped on radio link control (RLC) acknowledged mode (AM) where PDCP is not terminated in the Master Node (MN) (i.e., in the case of dual connectivity, Secondary-Node (SN)-terminated bearers).

A problem with avoiding count wrap-around on bearers mapped on RLC AM is that there is no proper PDCP procedure for resetting the count value. It is noted that the count value is maintained also at PDCP re-establishment (invoked for example at handover). So, the only way to reset the count is to release the data radio bearer (DRB) and add a new one.

In the context of an SN-terminated bearer, what is also problematic is that the SN has no means to request DRB release and add from the MN that has the control. The SN may request release of the bearer; however, when doing so, there is no way for the MN to determine that the reason for release is an impending count wrap-around, and that a new DRB should be established in place of the one being released. The consequence is that the DRB is simply released before the PDCP count reaches its maximum value, even though the traffic demand for the bearer remains.

One embodiment provides a process for avoiding PDCP count wrap-around for non-MN-terminated bearers in multi-connectivity. In an embodiment, the process may include, upon detecting that count wrap-around is impending on the bearer, the node hosting PDCP for the bearer (e.g., SN) sends to the MN a counter check request that may include the count value approaching its maximum value. Upon receiving this request message and possibly observing the high count value in it, the Master Node may initiate the DRB release and add a new bearer, as required.

In an embodiment, the highest downlink (DL) and/or uplink (UL) count value (e.g., 4294967295) in the counter check request message may be used to indicate that the PDCP count wrap-around event is to occur soon and the Master Node should take an action for the given bearer. This option may be allowed given that the node hosting PDCP should not allow the count to progress that far (at least in UL).

According to another embodiment, the inclusion of the DL and UL count values in the counter check request message may be optional. According to this example embodiment, the absence of the count value fields indicates, to the Master Node, that the counter check request was sent for the reason of indicating a count wrap-around event.

An advantage of certain embodiments includes avoiding or minimizing impact to the existing stage-3 specification. Also, the usage of a counter check request message to advise a Master Node of a high count value can be understood to indicate that a bearer release and add is desired, whereas a SN may use a SN modification required message to just release bearers.

Figure 2:
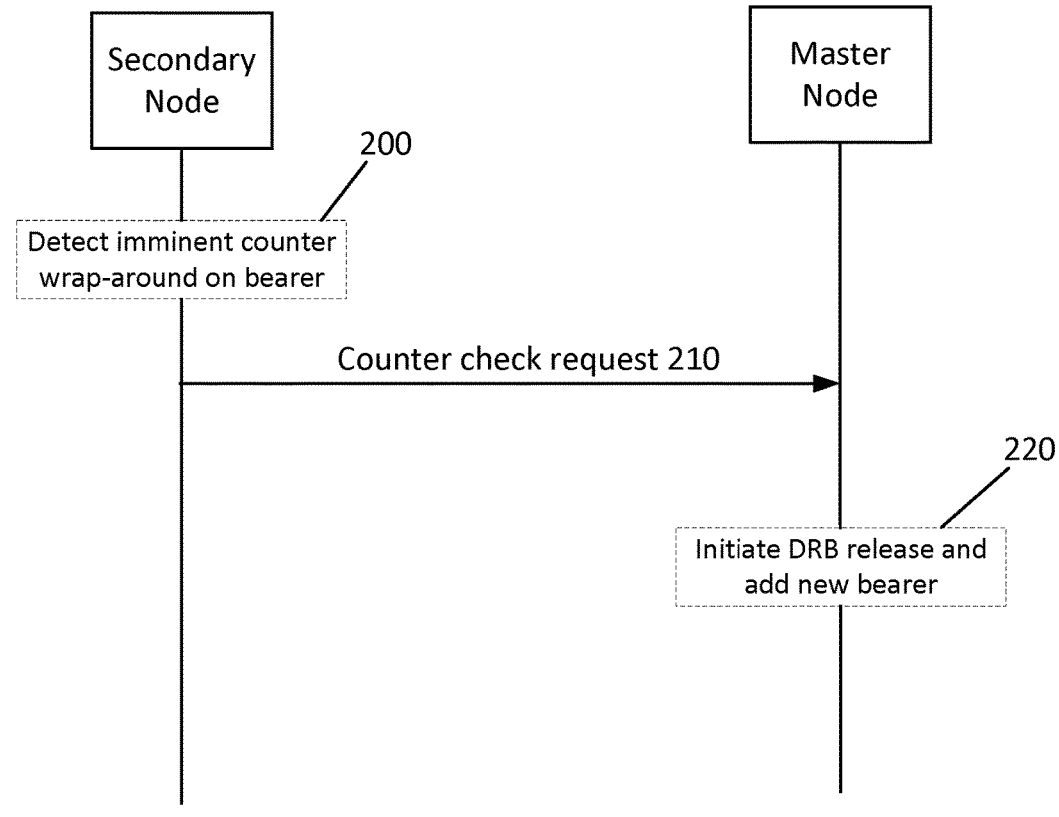
FIG. 2 illustrates an example signaling diagram, according to one embodiment.

FIG. 2 illustrates an example signaling diagram depicting a process for preventing count wrap-around, according to one embodiment. As illustrated in the example of FIG. 2, a network node may determine or detect, at 200, that count wrap-around is imminent on the bearer. In an embodiment, the count may be a PDCP count and the node may be the node hosting PDCP for the bearer, such as a secondary node. According to one embodiment, upon detecting that the count wrap-around is approaching on the bearer, the node hosting PDCP for the bearer may transmit, at 210, a counter check request to a master node in order to indicate that the count wrap-around is to occur soon. In certain embodiments, the counter check request message 210 may include the count value that is approaching its maximum value. Upon receiving the counter check request message and possibly observing or determining the high count value in it, at 220, the master node may initiate DRB release and add a new bearer, as required. In one example embodiment, the highest downlink (DL) and/or uplink (UL) count value (e.g., 4294967295) in the counter check request message 210 may be used to indicate that the count wrap-around event is to occur soon and that the master node should take an action for the given bearer. It is noted that the inclusion of the DL and UL count values in the counter check request message may be optional. According to an example embodiment, the absence of count value fields in the counter check request message may then indicate, to the master node, that the counter check request was sent for the reason of indicating a count wrap-around event and the master node may take appropriate action at 220.

Figures 3A, 3B:
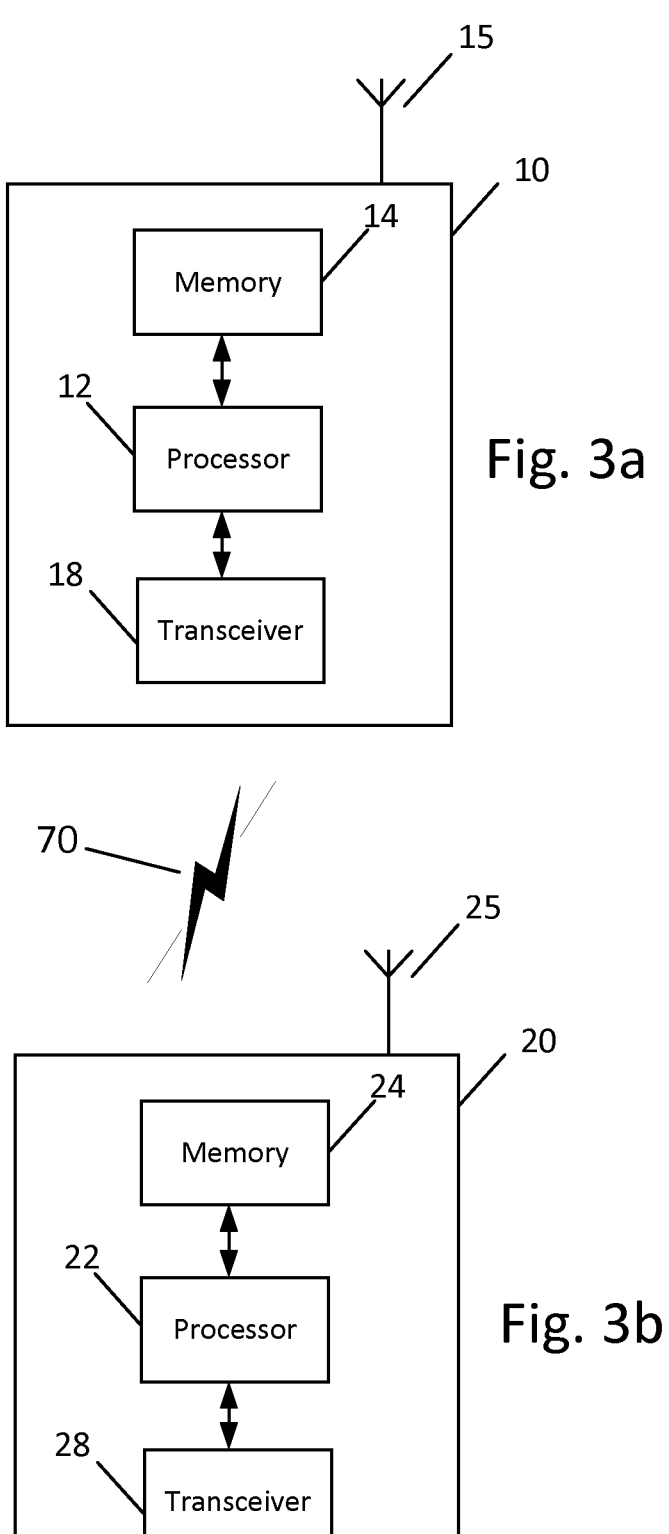
FIG. 3a illustrates an example block diagram of an apparatus, according to one embodiment.
FIG. 3b illustrates an example block diagram of an apparatus, according to another embodiment.

FIG. 3*a* illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 3*a*.

As illustrated in the example of FIG. 3*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device) or I/O circuitry.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. In one example, embodiment apparatus 10 may be a network node or gNB acting as a master node. According to certain embodiments, apparatus 10 may be controlled by memory 14 and processor 12 to perform the functions associated with any of the embodiments described herein, such as the flow, signaling or block diagrams illustrated in FIGS. 1-2 or FIG. 4 discussed below. In certain embodiments, apparatus 10 may be configured to prevent count wrap-around, for example, where a UE is configured in dual or multi-connectivity.

For instance, in some embodiments, apparatus 10 may be controlled by memory 14 and processor 12 to receive, from a node hosting PDCP, a counter check request that indicates that the count wrap-around is to occur soon. In certain embodiments, the counter check request message may include the count value that is approaching its maximum value. Upon receiving the counter check request message and possibly observing or determining the high count value approaching its maximum value, apparatus 10 may be controlled by memory 14 and processor 12 to initiate DRB release and add a new bearer, which in turn may avoid the count wrap-around. In one example embodiment, the highest downlink (DL) and/or uplink (UL) count value (e.g., 4294967295) may be included in the received counter check request message to indicate that the count wrap-around event is to occur soon and that the master node should take an action for the given bearer. However, the inclusion of the DL and UL count values in the counter check request message may be optional. According to another embodiment, the absence of count value fields in the received counter check request message may indicate, to the apparatus 10, that the counter check request was sent for the reason of indicating a count wrap-around event and apparatus 10 may then be controlled to initiate DRB release and, in an optional embodiment, to add the new bearer.

FIG. 3b illustrates an example of an apparatus 20 according to another embodiment. In an embodiment, apparatus 20 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3b.

As illustrated in the example of FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping compo-
nents, an Inverse Fast Fourier Transform (IFFT) module,
and the like, to process symbols, such as OFDMA symbols,
carried by a downlink or an uplink.

For instance, transceiver 28 may be configured to modu-
late information on to a carrier waveform for transmission
by the antenna(s) 25 and demodulate information received
via the antenna(s) 25 for further processing by other ele-
ments of apparatus 20. In other embodiments, transceiver 28
may be capable of transmitting and receiving signals or data
directly. Additionally or alternatively, in some embodiments,
apparatus 10 may include an input and/or output device (I/O
device) or I/O circuitry. In certain embodiments, apparatus
20 may further include a user interface, such as a graphical
user interface or touchscreen.

In an embodiment, memory 24 stores software modules
that provide functionality when executed by processor 22.
The modules may include, for example, an operating system
that provides operating system functionality for apparatus
20. The memory may also store one or more functional
modules, such as an application or program, to provide
additional functionality for apparatus 20. The components of
apparatus 20 may be implemented in hardware, or as any
suitable combination of hardware and software. According
to an example embodiment, apparatus 20 may optionally be
configured to communicate with apparatus 10 via a wireless
or wired communications link 70.

According to some embodiments, processor 22 and
memory 24 may be included in or may form a part of
processing circuitry or control circuitry. In addition, in some
embodiments, transceiver 28 may be included in or may
form a part of transceiving circuitry.

As discussed above, according to some embodiments,
apparatus 20 may be a network node or RAN node, such as
a base station, access point, Node B, eNB, gNB, WLAN
access point, or the like. In one example, embodiment
apparatus 20 may be a network node hosting PDCP, for
example a secondary network node. According to certain
embodiments, apparatus 20 may be controlled by memory
14 and processor 12 to perform the functions associated with
any of the embodiments described herein, such as the flow,
signaling or block diagrams illustrated in FIGS. 1-2 or FIG.
4 discussed below. In certain embodiments, apparatus 20
may be configured to prevent count wrap-around, for
example, where a UE is configured in dual or multi-con-
nectivity.

For example, in certain embodiments, apparatus 20 may
be controlled by memory 24 and processor 22 to determine
or detect that count wrap-around is imminent on the bearer.
In one example, the count may be a PDCP count. According
to an embodiment, upon detecting the imminent count
wrap-around, apparatus 20 may be controlled by memory 24
and processor 22 to transmit, to a master node, a counter
check request that indicates that the count wrap-around is to
occur soon. In certain embodiments, the counter check
request message may include the count value that is
approaching its maximum value. According to one embodi-
ment, the transmission of the counter check request mes-
sage, and optionally including the high count value in the
message, triggers the master node to initiate DRB release
and add a new bearer, which in turn may avoid the count
wrap-around. In one example embodiment, the highest
downlink (DL) and/or uplink (UL) count value (e.g.,
4294967295) may be included in the transmitted counter
check request message to indicate that the count wrap-
around event is to occur soon and that the master node
should take an action for the given bearer. However, the inclusion of the DL and UL count values in the counter
check request message may be optional. According to
another embodiment, the absence of count value fields in the
transmitted counter check request message may indicate, to
the master node, that the counter check request was sent for
the reason of indicating a count wrap-around event and the
master node may then be triggered to initiate DRB release
and add the new bearer.

Figure 4A:
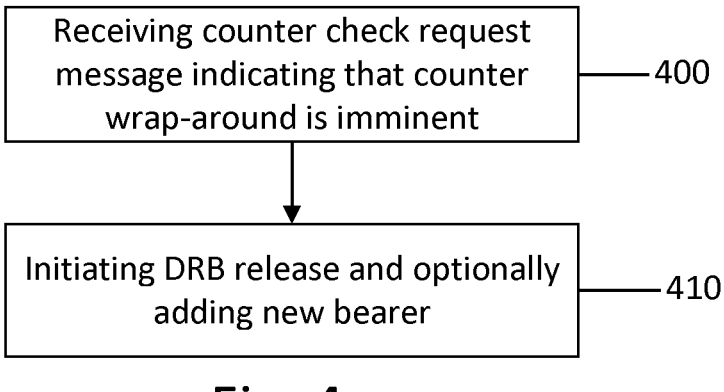
FIG. 4a illustrates an example flow diagram of a method, according to an embodiment.

FIG. 4a illustrates an example flow diagram of a method,
according to an embodiment. In certain embodiments, the
method may be a process for preventing or avoiding count
wrap-around (e.g., PDCP count) for non-master node ter-
minated bearers in dual-connectivity or multi-connectivity,
according to an example embodiment. In one embodiment,
the method may be performed by a network node, such as a
base station, eNB, gNB, relay node, or access node, such as
a master node, for example.

In an embodiment, the method of FIG. 4a may include, at
400, receiving, e.g., from a node hosting PDCP, a counter
check request that indicates that the count wrap-around will
be occurring soon. In certain embodiments, the counter
check request message may include the count value that is
approaching its maximum value. Upon receiving the counter
check request message and possibly observing the high
count value in it, the method may include, at 410, initiating
DRB release and adding a new bearer, which in turn may
avoid the count wrap-around. In one example embodiment,
the highest downlink (DL) and/or uplink (UL) count value
(e.g., 4294967295) may be included in the received counter
check request message to indicate that the count wrap-
around event is to occur soon and that the master node
should take an action for the given bearer. The inclusion of
the DL and UL count values in the counter check request
message may be optional. According to another embodi-
ment, the absence of count value fields in the received
counter check request message may indicate, to the receiv-
ing node (e.g., master node), that the counter check request
is received for the purpose of indicating a count wrap-
around event and then initiating DRB release and optionally
adding the new bearer.

Figure 4B:
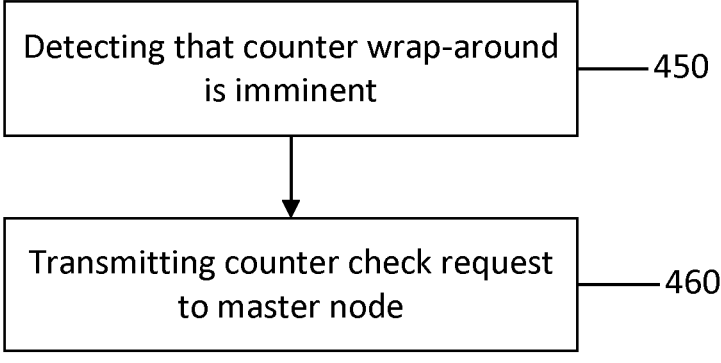
FIG. 4b illustrates an example flow diagram of a method, according to another embodiment.

FIG. 4b illustrates an example flow diagram of a method,
according to another embodiment. In certain embodiments,
the method of FIG. 4b may be a process for informing a
dual-connectivity or multi-connectivity master node of an
impending packet counter value wrap-around. According to
one embodiment, the wrap-around may be of a PDCP
counter for non-master node terminated bearers in dual-
connectivity or multi-connectivity, as an example. In an
embodiment, the method may be performed by a network
node, such as a base station, eNB, gNB, relay node, or access
node, such as a secondary node or node hosting PDCP, for
example.

In an embodiment, the method of FIG. 4b may include, at
450, determining or detecting that a count wrap-around is
imminent. The method may then include, at 460, transmit-
ting, to a master node, a counter check request that indicates
that the count wrap-around is to occur soon. In certain
embodiments, the transmitting 460 may include transmitting
the counter check request message to include the count value
that is approaching its maximum value. According to one
embodiment, the transmitting 460 of the counter check
request message, and optionally including the high count
value in the message, triggers the master node to initiate
DRB release and add a new bearer, which in turn may avoid
the impending count wrap-around. In one example embodi-
ment, the highest downlink (DL) and/or uplink (UL) count
value (e.g., 4294967295) may be included in the transmitted counter check request message to indicate that the count wrap-around event is to occur soon and that the master node should take an action for the given bearer. However, the inclusion of the DL and UL count values in the counter check request message may be optional. According to another embodiment, the absence of count value fields in the transmitted counter check request message may indicate, to the master node, that the counter check request was sent for the reason of indicating a count wrap-around event and the master node may then be triggered to initiate DRB release and, in an embodiment, to optionally add the new bearer.

Therefore, embodiments of the invention provide several technical improvements, enhancements, and/or advantages. Various example embodiments provide an approach for avoiding PDCP count wrap around. Accordingly, as a result of certain embodiments, network throughput and UE throughput performance may be enhanced. As such, embodiments of the invention can improve performance and throughput of networks and network nodes including, for example, access points, base stations/eNBs/gNBs, and mobile devices or UEs. Accordingly, the use of embodiments of the invention result in improved functioning of communications networks and their nodes.

In some embodiments, the functionality of any of the methods, processes, signaling diagrams, algorithms or flow charts described herein may be implemented by software and/or computer program code or portions of code stored in memory or other computer readable or tangible media, and executed by a processor.

In some embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One embodiment is directed to a method that may include receiving, from a node hosting PDCP for a data radio bearer (DRB), a counter check request that indicates that a count wrap-around will be occurring soon. In certain embodiments, the method may then include, in response to receiving the request, initiating release of the DRB and optionally adding a new bearer.

Another embodiment is directed to an apparatus including at least one processor and at least one memory comprising computer program code. The at least one memory and computer program code may be configured, with the at least one processor, to cause the apparatus at least to receive, from a node hosting PDCP for a data radio bearer (DRB), a counter check request that indicates that a count wrap-around will be occurring soon. In certain embodiments, the at least one memory and computer program code may be configured, with the at least one processor, to cause the apparatus at least to, in response to receiving the request, initiate release of the DRB and optionally add a new bearer.

Another embodiment is directed to an apparatus including receiving means for receiving, from a node hosting PDCP for a data radio bearer (DRB), a counter check request that indicates that a count wrap-around will be occurring soon. In certain embodiments, the apparatus may then include, in response to receiving the request, initiating means for initiating release of the DRB and optionally adding a new bearer.

Another embodiment is directed to a method that may include determining or detecting that a counter wrap-around is imminent. The method may then include transmitting, to a master node, a counter check request that indicates that the counter wrap-around is to occur soon, which may trigger the master node to initiate data radio bearer (DRB) release and optionally adding a new bearer. In certain embodiments, the indicating may include transmitting the counter check request message to include the count value that is approaching its maximum value.

Another embodiment is directed to an apparatus including at least one processor and at least one memory comprising computer program code. The at least one memory and computer program code may be configured, with the at least one processor, to cause the apparatus at least to determine or detect that a counter wrap-around is imminent. The at least one memory and computer program code may be further configured, with the at least one processor, to cause the apparatus at least to transmit, to a master node, a counter check request that indicates that the counter wrap-around is to occur soon, which may trigger the master node to initiate data radio bearer (DRB) release and optionally adding a new bearer. In certain embodiments, the transmitted counter check request message may include the count value that is approaching its maximum value.

Another embodiment is directed to an apparatus including detecting means for detecting that a counter wrap-around is imminent. The apparatus may then include transmitting means for transmitting, to a master node, a counter check request that indicates that the counter wrap-around is to occur soon, which may trigger the master node to initiate data radio bearer (DRB) release and optionally adding a new bearer. In certain embodiments, the transmitting means may include means for transmitting the counter check request message to include the count value that is approaching its maximum value.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:

receiving, by a master node, from a node hosting packet data convergence protocol for a data radio bearer comprising a non-master node terminated bearer in multi-connectivity, a counter check request including a count value, wherein the counter check request indicates that a count wrap-around event is to occur, wherein the count value comprises a hyper frame number and packet data convergence protocol sequence number, wherein the count wrap-around event comprises setting the count value to zero upon reaching a maximum value of the count value, and wherein the maximum value of the count value comprises at least one of a highest downlink count value or highest uplink count value;

in response to the receiving, determining, by the master node, that the count value is within a threshold of its maximum value; and in response to the determining, initiating, by the master node, release of the data radio bearer and optionally adding a new bearer, wherein the initiating of the release avoids occurrence of the count wrap-around event.

2. An apparatus, comprising:

at least one processor; and at least one memory comprising computer program code, the at least one memory and computer program code configured, with the at least one processor, to cause the apparatus at least to receive, from a node hosting packet data convergence protocol for a data radio bearer comprising a non-master node terminated bearer in multi-connectivity, a counter check request including a count value, wherein the counter check request indicates that a count wrap-around event is to occur, wherein the count value comprises a hyper frame number and packet data convergence protocol sequence number, wherein the count wrap-around event comprises setting the count value to zero upon reaching a maximum value of the count value, and wherein the maximum value of the count value comprises at least one of a highest downlink count value or highest uplink count value;

in response to the receiving, determine that the count value is within a threshold of its maximum value; and in response to the determining, initiate release of the data radio bearer and optionally add a new bearer, wherein the initiating of the release avoids occurrence of the count wrap-around event, wherein the apparatus comprises a master node.

3. A method, comprising:

determining or detecting, by a secondary node, that a count value is within the threshold its maximum value, wherein the maximum value of the count value comprises at least one of a highest downlink count value or highest uplink count value, and wherein the count value comprises a hyper frame number and packet data convergence protocol sequence number; and in response to the determining or detecting, transmitting, by the secondary node, to a master node, a counter check request including the count value that is within the threshold of its maximum value, wherein the counter check request indicates that a count wrap-around event is to occur, and wherein the count wrap-around event comprises setting the count value to zero upon reaching the maximum value of the count value, wherein the counter check request triggers the master node to initiate data radio bearer release of a data radio bearer comprising a non-master node terminated bearer in multi-connectivity and optionally to add a new bearer, and the initiating of the release avoids occurrence of the count wrap-around event.

4. An apparatus, comprising:

at least one processor; and at least one memory comprising computer program code, the at least one memory and computer program code configured, with the at least one processor, to cause the apparatus at least to determine or detect that a count value is within a threshold of its maximum value, wherein the maximum value of the count value comprises at least one of a highest downlink count value or highest uplink count value, and wherein the count value comprises a hyper frame number and packet data convergence protocol sequence number; and in response to the determining or detecting, transmit, to a master node, a counter check request including the count value that is within the threshold of its maximum value, wherein the counter check request indicates that a count wrap-around event is to occur, and wherein the count wrap-around event comprises setting the count value to zero upon reaching a maximum value of the count value, wherein the counter check request triggers the master node to initiate data radio bearer release of a data radio bearer comprising a non-master node terminated bearer in multi-connectivity and optionally to add a new bearer, and the initiating of the release avoids occurrence of the count wrap-around event, wherein the apparatus comprises a secondary node.

* * * * *